UNITED STATES PATENT OFFICE.

RAYMOND VIDAL, OF ASNIÈRES, FRANCE.

METHOD FOR PREPARING BLUE COLORING MATERIALS.

1,265,836.  Specification of Letters Patent.  Patented May 14, 1918.

No Drawing.  Application filed August 18, 1916. Serial No. 115,577.

*To all whom it may concern:*

Be it known that I, RAYMOND VIDAL, chemist, a citizen of the Republic of France, and resident of 10 Rue de la Comète, Asnières, Seine, Republic of France, have invented an Improved Method for Preparing Blue Coloring Materials, of which the following is a specification.

This invention refers to the preparation of blue coloring materials and it consists in two operations, first: heating paramidophenol or the corresponding amidocresols in a medium formed by organic compounds to the boiling point in order to obtain a non-sulfureted blue coloring material; and second: transformation of the coloring material so obtained into a sulfureted coloring material by introducing sulfur in the medium in which the reaction takes place.

The organic compounds available for use in this process are the following: phenols, cresols, xylenols, either single or mixed, anilin, toluidins, xylidins.

Example: In a closed apparatus so constructed that the vapors produced flow back to it after condensation, I introduce 11 kilograms of paramidophenol and 5 kgs. 500 grams of the commercial mixture of the three cresols. The whole is then heated and maintained in ebullition during the time necessary to the formation of the first, non-sulfureted blue coloring material, i. e., about 5 to 6 hours. A sample taken out of the apparatus at that moment must dissolve bright blue in alkalies. At this moment 2 kgs. 750 grams of pulverized sulfur are introduced in the apparatus and heating is continued and ebullition maintained until the escape of hydrogen sulfid which takes place seems to stop.

The excess of organic compound is then collected either by simple distillation or by distillation in the vacuum, and the mass is taken out of the apparatus.

Said mass is afterward purified by washing in hot water. It has the appearance of a thick tar which becomes solid when cooling.

In the foregoing example the paramidophenol can be replaced by one of the corresponding amidophenols and instead of the cresols I may use any one of the above named organic compounds, and I desire it to be understood that the appended claims are to be interpreted as covering the equivalents stated in this description.

The amidocresols employed in this case can be used in the mixed state.

The coloring materials thus obtained are soluble in alkalies to which there are added or not alkaline hydrosulfites, and in sodium sulfid. In this state they dye directly vegetable fibers in indigo blue shades which resist acids and chlorin. Owing to these qualities they differ from the known sulfur coloring materials and especially from the blue obtained by the direct fusion of the paramidophenol with sulfur which latter blue is not capable of resisting either acids or chlorin.

Having now described and ascertained the nature of my invention and in what manner the same is to be performed, I declare that what I claim is:

1. The herein described process which consists in first boiling paramidophenol and cresol until a sample of the product dissolves bright blue in alkalies, then adding sulfur, and continuing to boil until the evolution of hydrogen sulfid appears to stop.

2. The herein described process which consists in first boiling paramidophenol and cresol, while returning the condensed vapors to return to the boiling mass, until a sample of the product dissolves bright blue in alkalies, and then adding sulfur to the mass and continuing to boil until the evolution of hydrogen sulfid appears to stop.

3. The herein described coloring material produced by the boiling of paramidophenol and cresol first alone and subsequently with sulfur, said material being soluble in alkalies, in sodium sulfid, and in a mixture of alkalies with alkaline hydrosulfites, said material dyeing vegetable fibers directly in indigo blue shades resistant to acids and to chlorin.

RAYMOND VIDAL.

Witnesses:
SENTI ZOU ROBERT.
G. JENNUELLE.